US005577583A

United States Patent [19]

O'Donnell

[11] Patent Number: 5,577,583

[45] Date of Patent: Nov. 26, 1996

[54] FREE WHEEL DOUBLE LOCK CLUTCH MECHANISM

[75] Inventor: Patrick H. O'Donnell, Chicago, Ill.

[73] Assignee: Kelsey-Hayes Company, Romulus, Mich.

[21] Appl. No.: 405,477

[22] Filed: Mar. 16, 1995

[51] Int. Cl.[6] ...................................................... F16D 11/06

[52] U.S. Cl. ............................. 192/79; 192/71; 292/201; 292/336.3

[58] Field of Search ................................. 192/79, 71, 90, 192/89.21; 292/336.3, DIG. 23, DIG. 27, 201, 216

[56] References Cited

U.S. PATENT DOCUMENTS

| | | | |
|---|---|---|---|
| 4,364,249 | 12/1982 | Kleefeldt | 292/DIG. 23 X |
| 4,966,266 | 10/1990 | Yamada et al. | 192/71 X |
| 5,474,339 | 12/1995 | Johnson | 292/201 X |

*Primary Examiner*—Rodney M. Lindsey

*Attorney, Agent, or Firm*—MacMillan, Sobanski & Todd

[57] ABSTRACT

A clutch providing lost motion between a motor operated mechanism for operating a vehicle door lock and a manually operated mechanism for operating the vehicle door lock. The clutch includes a cam member rotatable about an axis between a first "locking" position and a second "unlocking" position and an output member rotatable about the axis between a third "locking" position and a fourth "unlock" position. The output member may be connected to a member selectively moveable to rotate the output member about the axis between the lock and unlock positons. The output member is adapted to actuate the vehicle door lock. The output member may be coupled to actuate the vehicle door lock through an output lever. The output member may be releasably fixed to the output lever. The cam member may be selectively rotated to a double lock position causing the output member to move radially relative to the axis and the output lever, thereby uncoupling the output member and the output lever, disconnecting the output member from the vehicle door lock.

19 Claims, 5 Drawing Sheets

FREE WHEEL DOUBLE LOCK CLUTCH MECHANISM

BACKGROUND OF THE INVENTION

This invention relates in general to vehicle door lock mechanisms and in particular to a clutch providing lost motion between a motor operated mechanism and a manually operated mechanism for operating a vehicle door lock.

Vehicles such as passenger cars are commonly equipped with individual latch assemblies that secure respective passenger and driver doors closed. Each latch assembly is typically provided with a manual latch actuating mechanism for unlatching the latch assembly from outside and inside the vehicle, i.e., outer door operating thumb buttons or handles and inner door operating handles. Each latch assembly is also typically provided with an individual vehicle door lock. Vehicle door locks are well-known devices for selectively preventing a door from being unlatched by operation of the latch actuating mechanism. Vehicle door locks typically prevent unlatching of the associated latch assembly by selectively uncoupling the latch actuating mechanism from the latch assembly. Less commonly, vehicle door locks may be arranged to prevent unlatching of the associated latch assembly by selectively blocking movement of a component of the latch mechanism to prevent unlatching of the latch assembly, or by some combination of selectively uncoupling and blocking components of the latch mechanism. Vehicle door locks are typically provided with a key cylinder for manually operating the vehicle door lock mechanism from the exterior of the vehicle. Vehicle door locks are also normally provided with a manual locking mechanism for operating the vehicle door lock mechanism from the interior of the vehicle, i.e., a respective sill button. Furthermore, vehicle door locks are commonly provided with a remote lock actuating mechanism such as an electric actuator for remotely locking and unlocking the vehicle door lock.

In order to minimize the overall size of electric actuators, designers typically use relatively small electric motors to power the electric actuators. To provide the necessary torque for operating the vehicle door lock mechanism, the output from one of these electric motors is typically transmitted through a series of meshing gears formed into a gear train. This gear train amplifies the torque produced by the electric motor and applies this amplified torque to other moving parts of the vehicle door lock. The manually operated locking mechanisms are typically are connected to the vehicle door lock in parallel with the output of the gear train of the electric actuator. A relatively large amount of force is required to back-drive the gear train of the electric actuator during manual operation of the vehicle door lock. Therefore, it has been found desirable to provide a clutch in the electric actuator that uncouples the gear train and electric motor from the rest of the lock mechanism when manually operating the vehicle door lock. With the electric motor and gear train uncoupled from the rest of the lock mechanism, the force required to be exerted by a user to manually operate the lock mechanism is dramatically reduced.

As is commonly known, the vehicle door may be locked when the vehicle is unattended to prevent unauthorized entry into the vehicle. On vehicles with an interior manual locking mechanism, a thief may break a window of the vehicle and reach inside to manually unlock the latch assembly. To prevent this, it is known to provide a latch assembly with a "double lock" antitheft feature by which the interior manual locking mechanism may be selectively disabled.

SUMMARY OF THE INVENTION

This invention relates to a clutch providing lost motion between a motor operated mechanism for operating a vehicle door lock and a manually operated mechanism for operating the vehicle door lock. The clutch includes a cam member rotatable about an axis between a first "locking" position and a second "unlocking" position and an output member rotatable about the axis between a third "lock" position and a fourth "unlock" position. The output member has a first drive surface and a second drive surface spaced apart from the first drive surface of the output member. The cam member has a first drive surface disposed to engage the first drive surface of the output member. The first drive surface of the cam member urges the output member to the lock position when the cam member is rotated to the locking position. The cam member also has a second drive surface disposed to engage the second drive surface of the output member. The second drive surface of the cam member urges the output member to the unlock position when the cam member is rotated to the unlocking position. The clutch also includes a spring which urges the cam member to rotate about the axis toward a neutral position between the locking (first) position and the unlocking (second) position of the output member. When the cam member is in this neutral position, the first drive surface of the cam member is spaced apart from the first drive surface of the output member when the output member is in the lock position. Similarly, with the cam member in the neutral position, the second drive surface of the cam member is spaced apart from the second drive surface of the output member when the output member is in the unlock position. The output member may be connected to a member selectively moveable to rotate the output member about the axis between the lock and unlock positions. The output member is adapted to actuate the vehicle door lock. The output member may be coupled to actuate the vehicle door lock through an output lever. The output member may be releasably fixed to the output lever. The cam member may be selectively rotated to a double lock position causing the output member to move radially relative to the axis and the output lever, thereby uncoupling the output member and the output lever, disconnecting the output member from the vehicle door lock.

Various objects and advantages of this invention will become apparent to those skilled in the an from the following detailed description of the preferred embodiment, when read in light of the accompanying drawings.

DETAILED DESCRIPTION OF THE PREFERRED EMBODIMENT

Figure 1:
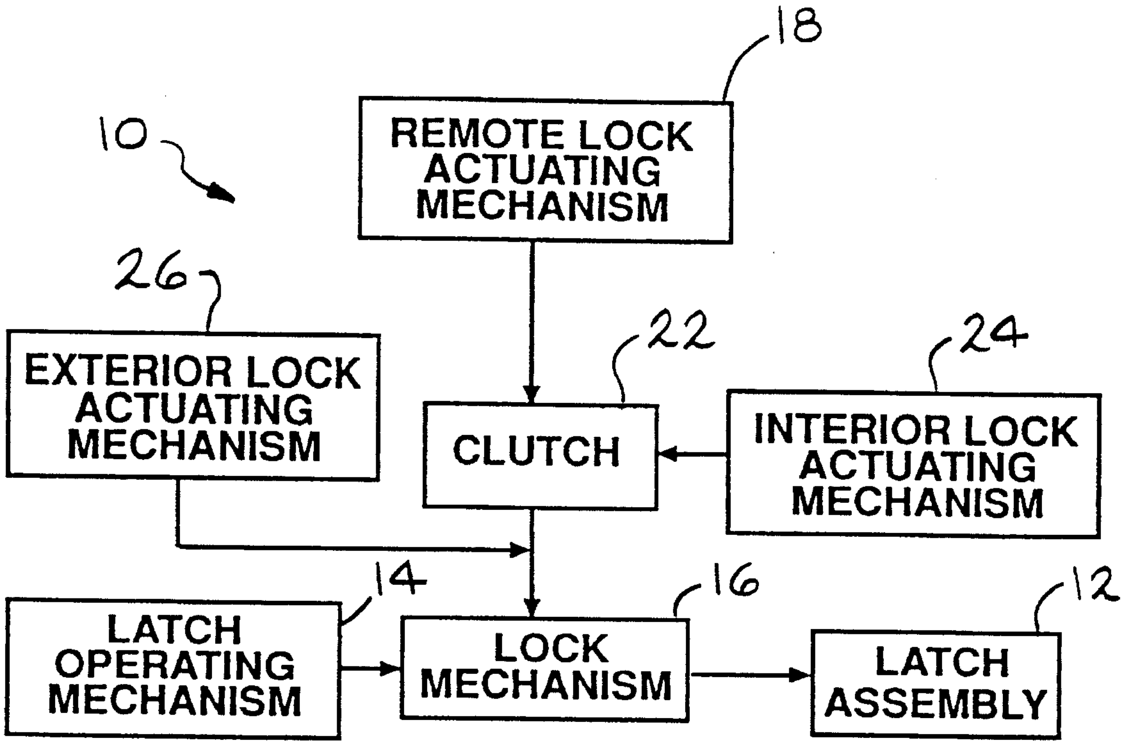
FIG. 1 is a block diagram of a typical vehicle latch assembly having a lock mechanism provided with a clutch mechanism and double locking feature according to the invention.

In the following description of the invention, certain terminology will be used for the purpose of reference only, and are not intended to be limiting. The terms "upper", "lower", "above", "below", "rightward", "leftward", "clockwise", and "counterclockwise" refer to directions in the drawings to which reference is made. The terms "inward" and "outward" refer to directions toward and away from, respectively, the geometric center of the component described. Such terminology will include the words specifically mentioned above, derivatives thereof, and words of similar import.

Referring now to the drawings, there is illustrated in FIG. 1 a block diagram of vehicle door latch mechanism 10. The latch mechanism 10 includes a conventional latch assembly 12 for securing vehicle doors (not shown) closed. Each latch assembly 12 is conventionally provided with a manual latch actuating mechanism 14 for unlatching the latch assembly 12 from outside and inside the vehicle. e.g., respective inner and outer door handles (not shown). Each latch assembly 12 is also typically provided with an individual vehicle door lock mechanism 16. Vehicle door locks are well-known devices for selectively preventing a door from being unlatched by operation of the latch actuating mechanism 14. The vehicle door lock mechanism 16 may be operated to selectively uncouple the latch actuating mechanism 14 from the latch assembly 12. Thus, although the latch actuating mechanism 14 can still be operated, the movement of the components of the latch actuating mechanism 14 is not transmitted to the latch assembly 12 to cause the door to be unlatched. Of course, those of ordinary skill in the art will recognize that the lock mechanism 16 may instead be conventionally configured to prevent unlatching of the associated latch assembly 12 by selectively blocking movement of a component of the latch assembly 12 or the latch actuating mechanism 14. Indeed, the lock mechanism 16 may be configured to uncouple the latch actuating mechanism 14 from the latch assembly 12, and simultaneously block movement of one or more components of the latch assembly 12 and the latch actuating mechanism 14. The lock mechanism 16 is selectively operated between a lock position and an unlock position. In the lock position, the latch actuating mechanism 14 is prevented from operating the latch assembly 12. In the unlock position, the latch actuating mechanism 14 is capable of operating the latch assembly 12 to unlatch the associated vehicle door, and permit the door to be opened.

A remote lock actuating mechanism 18 is provided to selectively actuate the lock mechanism 16 to the lock and unlock positions thereof. In the illustrated embodiment, the remote lock actuating mechanism 18 includes an electric motor (not shown) and a plurality of meshing gears (not shown) connecting the motor to an input member 20 (FIG. 2) of a clutch 22. As previously indicated, a relatively large amount of torque is required to back-drive an electric motor through such a gear train. The clutch 22 provides lost motion between the remote lock actuating mechanism 18 and the lock mechanism 16 in a manner which will be described below. The lost motion provided by the clutch 22 enables manually operated locking mechanisms, such as an interior lock actuating mechanism 24, or an exterior lock actuating mechanism 26 to be operated without having to back-drive the components of the remote lock actuating mechanism 18.

The interior lock actuating mechanism 24 may be any conventional operating mechanism, such as an interior sill button (not shown) and associated linkage 28 (partially shown in FIG. 6) to connect the sill button to the clutch 22, in a manner which will be described below. Similarly, the exterior lock actuating mechanism 26 may be any conventional operating mechanism. For example, the exterior lock actuating mechanism may be an exterior key cylinder (not shown) coupled by an associated linkage 30 (partially shown in FIG. 6) to the lock mechanism 16, in a manner which will be described below.

Figure 2:
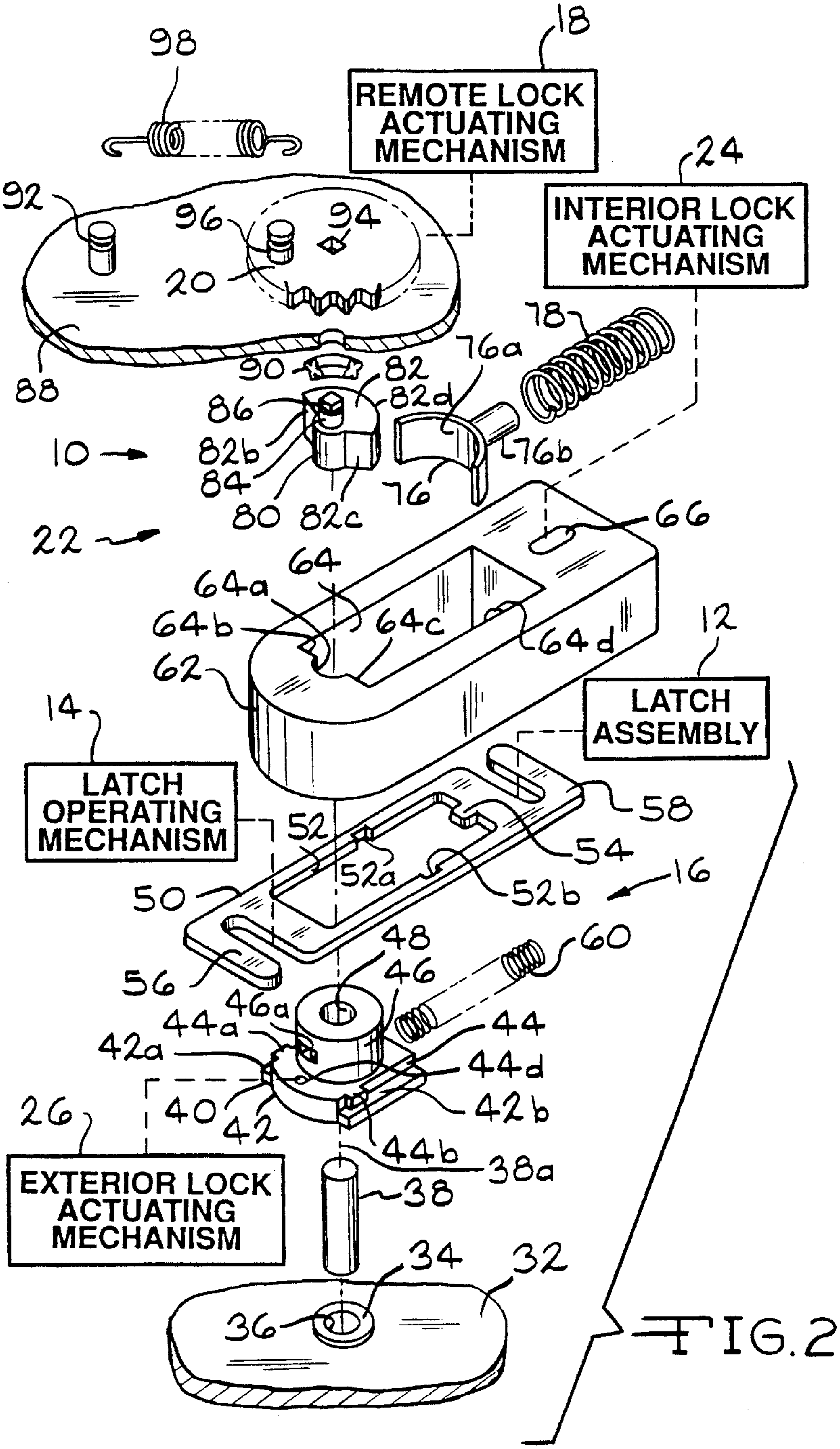
FIG. 2 is an exploded perspective view of a first embodiment of the clutch mechanism illustrated in FIG. 1.

Referring now to FIG. 2, the clutch 22 is shown in exploded form. A frame 32 (only partially shown) includes a raised surface 34. A recess 36 is formed in the raised surface 34. A boss 37 (shown in FIGS. 9, 10, and 11) or pin extends upwardly from the frame 32 at a point spaced apart from the raised surface 34, the purpose of which will be described below.

An elongate, cylindrical pivot pin 38 has one end fixed in the recess 36. The pivot pin 38 extends perpendicularly from the frame 32, and defines a longitudinal axis 38*a*, shown in phantom.

An index member 40 is pivotally mounted on the pivot pin 38 for rotation about the axis 38*a*. The index member 40 bears against the raised surface 34, but is otherwise spaced apart from the frame 32, thereby decreasing the friction between the rotatable output lever 40 and the frame 32. Of course, those of ordinary skill in the art will recognize that other conventional methods may be used to allow the index member 40 to freely rotate relative to the frame 32, including forming a boss on the index member 40 to bear against the frame 32.

Figure 3:
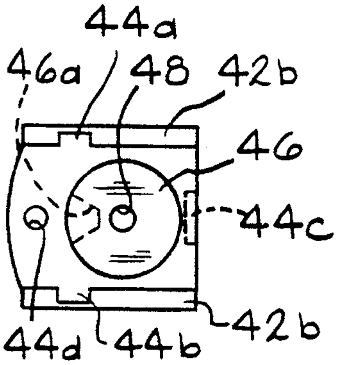
FIG. 3 is a partial top plan view of the index member illustrated in FIG. 2.
Figure 6:
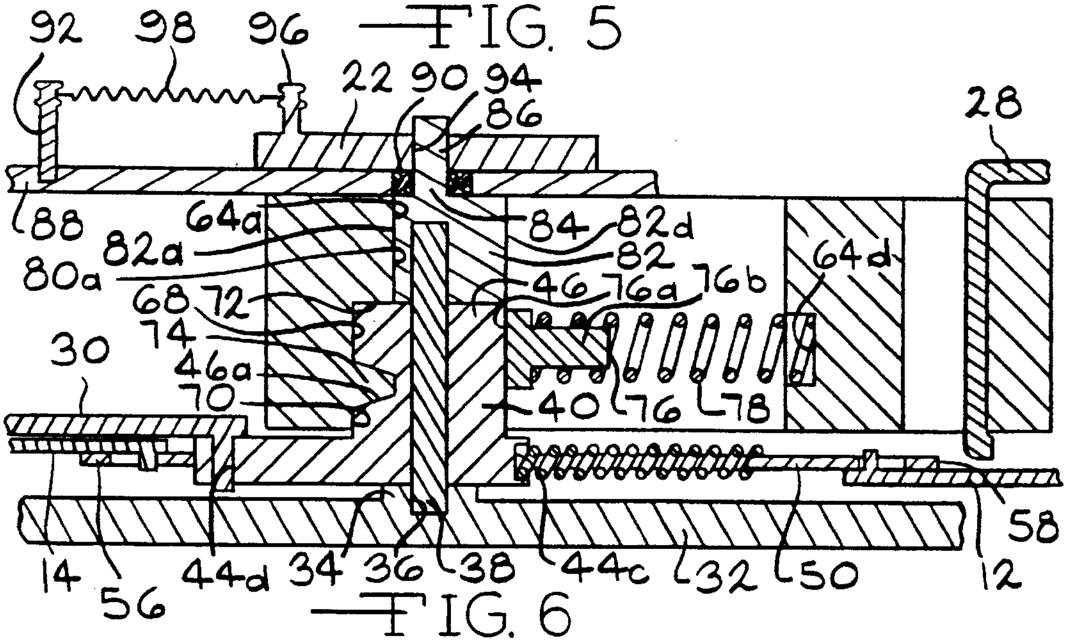
FIG. 6 is a sectional side view of the clutch mechanism illustrated in FIG. 2.

Referring now to FIGS. 2, 3, and 6, the index member 40 includes a lower portion 42 having a rectangular outline. A rectangular central portion 44 of the index member 40 has a reduced width with respect to the lower body portion 42. The lower body portion 42 thus forms a pair of flanges 42a and 42b extending outwardly from the left and right sides of the index member 40. A pair of lugs 44a and 44b extend outwardly from the left and right sides of the central portion 44 of the index member 40. The lugs 44a and 44b are spaced upwardly from the flanges 42a and 42b. A recess 44c (shown in FIGS. 3 and 6) is formed in one end of the central portion 44 of the index member 40. A vertically extending bore 44d is formed through the central portion 44 and lower portion 42 of the index member. As shown in FIG. 6, the linkage 30 is received in the bore 44d, thus operatively connecting the index member 40 to the exterior lock actuating mechanism 26. A tubular upper portion 46 of the index member 40 extends perpendicular to the central portion 44 of the index member 40. As also shown in FIGS. 3 and 6, an inwardly tapered slot 46a is formed in the upper portion 46, opposite to the side of the index member 40 in which the recess 44c is formed. A vertical bore 48 is formed through the index member 40. The pivot pin 38 extends through the bore 48 through the index member to pivotally mount the index member 40 as indicated above.

An output lever 50 is fitted onto the index member 40. The output lever 50 includes a rectangular central aperture 52. A pair of opposed, outwardly extending notches 52a and 52b are formed into, respectively, the left and right edges of the aperture 52, near one end of the aperture 52. An inwardly extending tab 54 projects into the aperture 52 from the end of the aperture 52 near the notches 52a and 52b.

The notches 52a and 52b are spaced from the end on which the tab 54 is formed. This permits the output lever to be passed over the upper portion 46 and central portion 44 of the index member 40, with the lugs 44a and 44b respectively passing through the notches 52a and 52b, without the tab 54 contacting the index member 40. When the output lever 50 is subsequently moved so that the tab 54 is moved radially away from the index member 40, the output lever 50 is restricted against movement along the axis 38a by the lugs 44a and 44b, and the flanges 42a and 42b. The output lever 50 is free to slide radially relative to the index member 40 while being vertically restrained between the lugs 44a and 44b and the flanges 42a and 42b.

A hook 56 is formed at one end of the output lever 50, and a hook 58 is formed at the other end of the output lever 50. The hook 56 may be positioned in engagement with the latch operating mechanism 14 while the hook 58 can simultaneously be positioned in engagement with the latch assembly 12, thereby operatively connecting the latch operating mechanism 14 to the latch assembly 12 through the output lever 50. The output lever 50 and the index member 40 form part of the lock mechanism 16.

A compression spring 60 is mounted to urge the tab 54 of the output lever 50 radially away from the index member 40. One end of the spring 60 is seated about the tab 54. The other end of the spring is seated in the recess 44c formed in the index member 40. The output lever 50 is thus biased so that the end of the aperture 52 opposite the tab 54 is in contact with the index member 40. The purpose of biasing the output lever 50 with respect to the index member 40 will be explained below.

Referring now to FIGS. 2, 4, 5, and 6, the clutch 22 includes an output member 62 mounted on the upper portion 46 of the index member 40. The output member 62 is illustrated in the shape of an elongate rectangular lever arm. However, those of ordinary skill in the an will recognize in light of the disclosure of this application, that the output member 62 may have other suitable shapes such as a disk or an arm with a generally triangular outline. A generally rectangular aperture 64 is formed through the output member 62. A semicircular notch 64a is formed in the output member 62 at one end of the aperture 64. In FIGS. 6 through 10, the center of curvature of the notch 64 is coincident with the axis 38a, however, as shown in FIG. 11, the output member 62 may be moved in manner to be describe below to a double lock position in which the center of curvature of the notch 64 is not coincident with the axis 38. A pair of rectangular vertical surfaces 64b and 64c are defined by the output member 62 on either side of the notch 64a. The surfaces 64b and 64c are co-planar in the illustrated embodiment. However, it will be appreciated in light of the further disclosures of this application that the surfaces 64b and 64c may be formed at an angle to one another, and further that the surfaces 64b and 64c need not be flat or rectangular. A recess 64d is formed in the output member 62 at the opposite end of the aperture 64 from the notch 64a. A longitudinally elongated vertical slot 66 is formed through the output member 62 adjacent the end of the aperture 64 having the recess 64d. The purpose of the aperture 64, the notch 64a, the surfaces 64b and 64c, the recess 64d, and the slot 66 will be explained below.

Figure 4:
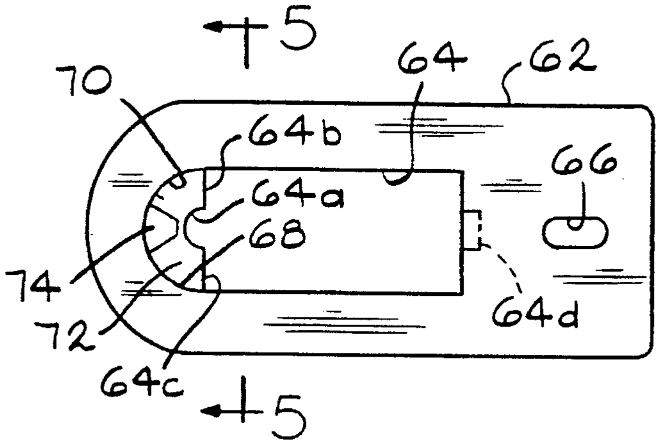
FIG. 4 is a bottom plan view of the output member illustrated in FIG. 2.
Figure 5:
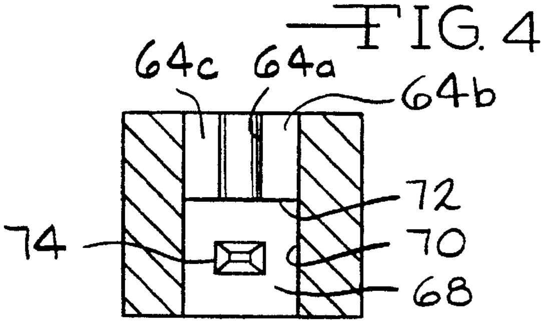
FIG. 5 a section view taken along the line 5—5 of FIG. 4

As shown in FIGS. 4, 5, and 6, a semi-cylindrical recess 68 is formed in the bottom surface of the output member 62, communicating with the lower portion of the aperture 64 and the notch 64a. The recess 68 has a semi-cylindrical vertical side wall surface 70, and a semicircular upper surface 72. In FIGS. 6 through 10, the curvature of the side wall surface 70 is centered on the axis 38a, and therefore is coaxial with the notch 64a. The recess 68 is complementary with a vertical half of the upper portion 46 of the index member 40. As illustrated in FIG. 6, the output member 62 is seated on the index member 40 with the upper portion 46 of the index member 40 received in the recess 68.

A boss 74 projects from the side wall surface 70. The boss 74 is generally in the shape of the frustum of a pyramid having a rectangular base. The boss 74 projects into and is complementary with the recess 46a formed in the upper portion 46 of the index member 40. The purpose of the boss 74 will be discussed below.

The latch mechanism 10 further includes a spring-loaded bearing member 76 that contacts the upper portion 46 of the index member 40, opposite the recess 46a. The bearing member 76 has a curved bearing surface 76a complementary to the cylindrical surface of the upper portion 46 of the index member 40. Extending outwardly from the bearing member 76, away from the bearing surface 76a, is a reduced diameter projection 76b. A coil spring 78 has one end seated in the recess 64d of the output member 62, and the other end disposed about the projection 76b of the bearing member 76. The spring 78 is compressed between the recess 64d of the output member 62 and the bearing member 76. Thus the spring 78 urges the bearing member 76 into contact with the upper portion 46 of the index member 40, and simultaneously urges the output member 62 to move radially so that the boss 74 contacts the upper portion 46 of the index member 40 opposite the bearing member 76. If the boss 74 is aligned with the recess 46a of the upper portion 46 of the index member 40, the boss will be urged into the recess 46a. Also, the side wall 70 of the recess 68 in the output member 62 will be urged into contact with the upper portion 46 of the index member 40.

Referring now to FIGS. 2 and 6, the clutch 22 further includes a cam member 80 pivotally mounted on the pivot pin 38. A recess 80*a* (seen in FIG. 6) in the lower surface of the cam member 80 receives the upper end of the pivot pin 38. The cam member 80 is generally cylindrical, having a curved vertical surface 80*b*. The center of curvature of the surface 80*b* is coincident with the axis 38*a*. The radius defined by the surface 80*b* is substantially equal to the radius defined by the notch 64*a* of the output member 62, with a sliding fit provided therebetween when the surface 80*b* of the cam member 80 is disposed within the notch 64*a* of the output member 62.

A cam lobe 82 extends radially outwardly from the cam member 80. The lobe 82 has a curved outer vertical surface 82*a*. The center of curvature of the surface 82*a* is the axis 38*a*. The lobe 82 also includes a pair of spaced apart, radially extending drive surfaces 82*b* and 82*c*. In the illustrated embodiment, the surfaces 82*b* and 82*c* define an arc through the lobe 82 of 120 degrees. However, those of ordinary skill in the art will recognize, in light of the disclosures of this application, that the lobe 82 can be shaped to define other angles between the drive surfaces 82*b* and 82*c* thereof to achieve the desired amount of lost motion in the clutch 22.

A cylindrical reduced diameter extension 84 projects from the upper surface of the cam member 80. The upper end 86 of the extension 84 has four flats formed thereon so that the end 86 has a square cross section. The extension 84, including the upper end 86, are coaxial with the axis 38*a*.

A cover 88, partially illustrated in FIGS. 2 and 6, mates with the frame 32 to at least partially enclose the index member 40, output lever 50, output member 62, and cam member 80. A hole 88*a* is defined in the cover 88, though which the extension 84 formed on the cam member 80 extends. The hole 88*a* is sufficiently small in diameter that the whole cam member 80 cannot pass therethrough. Thus the cover 88 retains the cam member 80 on the pivot pin 38. If desired, a seal, such as the illustrated quadseal 90 may be installed between the perimeter of the hole 88*a* and the extension 84 to seal the gap formed therebetween, while allowing the extension 84 to pivot relative to the cover 88. A pin 92 is fixed to the cover 88 at a point spaced apart from the hole 88*a*, and extends upwardly therefrom for a purpose which will be explained below.

A gear having a square central opening 94 forms the input member 20 for the clutch 22. The squared upper end 86 of the extension 84 on the cam member 80 extends through the square opening 94 of the input member 20 to key the cam member 80 and the input member 20 for rotation with one another. The gear teeth formed on the input member 20 mesh with the gear teeth of an output gear (not shown) of the remote lock actuating mechanism 18. Thus, the input member 20 and the cam member 80 fixed thereto can be rotated by the remote lock actuating mechanism 18.

The input member 20 is provided with an upwardly extending lug 96, which may be integrally formed therewith. A centering spring 98 is stretched between and anchored to the lug 96 on the input member 20 and the pin 92 on the cover 88. The centering spring 98 urges the input member 62 to rotate to a point, illustrated in FIG. 6, where the lug 96 is as close as possible to the pin 92. When the input member 20 is positioned with the lug 96 as close as possible to the pin 92, the cam member 80 (and the input member 20) will be positioned in a neutral position, illustrated by a dashed line 99 in FIGS. 8 and 10. Thus, the centering spring 98 is operatively coupled to the cam member 80 to urge the cam member 80 to the neutral position thereof.

Figure 8:
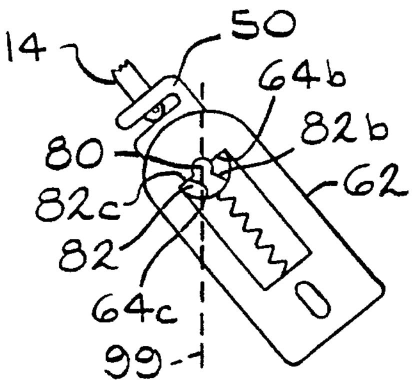
FIG. 8 is a view similar to that of FIG. 7, except showing the cam member in a neutral position.
Figure 9:
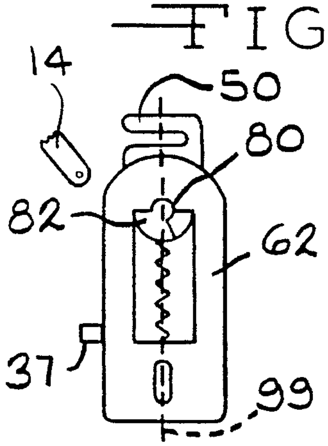
FIG. 9 is a schematic diagram of the cam member and output member illustrated in FIG. 2, with the output member and the cam member in respective lock positions.
Figure 10:
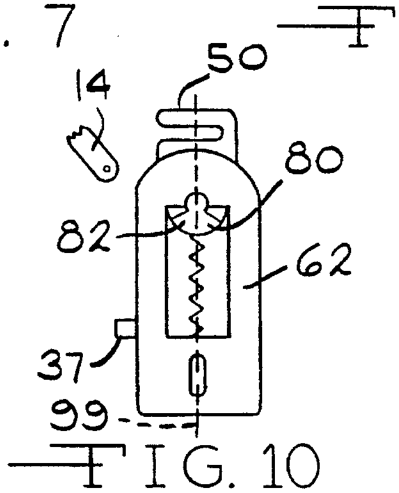
FIG. 10 is a view similar to that of FIG. 9, except showing the cam member in a neutral position.
Figure 11:
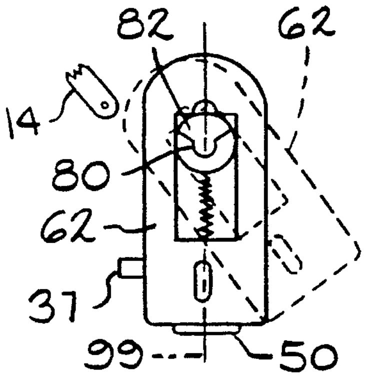
FIG. 11 is a view similar to that of FIGS. 9 and 10, except showing the cam member and the output member in respective double lock positions.

It should be noted that when the output lever 50 is aligned with the dashed line 99, as shown in FIGS. 9 through 11, the latch operating mechanism 14 is uncoupled from the latch assembly 12, and the lock mechanism 16 is locked. When the output lever 50 is positioned as shown in FIGS. 7 and 8, the output lever 50 couples the latch assembly 12 to the latch operating mechanism 14, and the lock mechanism 16 is unlocked.

The operation of the latch mechanism 10 will now be described. For the sake of illustration, assume the output lever 50 and the output member 62 are in their respective lock positions, as illustrated in FIG. 10. Also assume the cam member 80 is in the neutral position, as illustrated in FIG. 10. Additionally assume that the boss 74 on the output member 62 is engaging the recess 46*a* on the upper portion 46 of the index member 40 as illustrated in FIG. 6.

Figure 7:
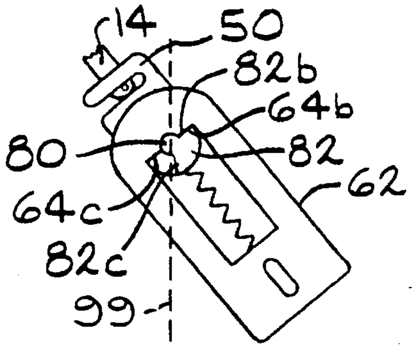
FIG. 7 is a schematic diagram of the cam member and output member illustrated in FIG. 2, with the output member and the cam member in respective unlock positions.

To unlock the latch mechanism 10 remotely, the remote lock actuating mechanism 18 is operated to cause the input member 20 to rotate the cam member 80 60 degrees counter clockwise from the neutral position thereof, as shown in FIG. 7. As the input member 20 rotates, the lug 96 thereon is moved away from the pin 92 on the cover 88, causing the centering spring 98 to stretch. The drive surface 82*b* of the cam member 80 contacts the drive surface 64*b* on the output member 62 after the cam member 80 has rotated 30 degrees. Thus, the cam member 80 drives the output member 62 30 degrees counter clockwise to the unlock position of the output member 62 during the last 30 degrees of movement of the cam member 80 toward the unlock position of the cam member 80. As the output member 62 rotates to the unlock position thereof, the output member 62 back-drives the interior lock actuating mechanism 24 to the unlock position thereof through the interior linkage 28 engaging the slot 66 in the output member 62. This may cause, for example, an interior sill button (not shown) to move upwardly when the latch mechanism 10 is unlocked remotely.

The output member 62, acting through the boss 74 engaging the recess 46*a* on the index member 40, rotates the index member 40 30 degrees counter clockwise to the unlock position of the index member 40. The boss 74 is retained in the recess 46*a* by the urging of the spring 78. As the index member 40 is rotated, it carries the output lever 50 therewith, moving the output lever 50 to the unlock position of the output lever 50. The output lever 50 is thereby moved so that the hook 56 thereon engages the linkage of the latch operating mechanism 14, and the hook 58 thereon engages the linkage of the latch assembly 12, coupling the latch assembly 12 to the latch operating mechanism 14. When the latch operating mechanism 14 is subsequently operated, the output lever 50 will be pulled radially by the hook 56, compressing the spring 60, and causing the hook 58 on the output lever 50 to unlatch the latch assembly 12.

Once the motor of the remote lock actuating mechanism 18 is deenergized, the centering spring 98 will pull the input member 20 and the cam member 80 back to the respective neutral positions thereof, as illustrated in FIG. 8. This causes the cam member 80 to rotate 60 degrees clockwise. Since the drive surfaces 64*b* and 64*c* are coplanar, they are located 180 degrees apart. Thus, when the cam member 80 rotates back 60 degrees clockwise to the neutral position the drive surface 82*c* of the lobe 82 on the cam member 80 will not be driven beyond to point of contact with the drive surface 64*c* of the output member 62. Therefore, the cam member 80 will not cause the output member 62 or the output lever 50 to move from the respective unlock positions thereof.

The latch mechanism 10 can be manually locked from the unlocked condition illustrated in FIG. 8. To accomplish this, the interior lock actuating mechanism 24 is operated to move the output member 62 30 degrees clockwise to the lock position of the output member 62, as shown in FIG. 10. This movement will not cause the drive surface **64*b* of the output member 62 to move the cam member 80. The output member 62, acting through the boss 74 thereof, will drive the index member 40 and the output lever 50 to their respective lock positions. Note that the lost motion developed by spring returning the cam member 80 to the neutral position allows movement of the output member 62 to the lock position of the output member 62 without back-driving the cam member 80 with the output member 62 during a subsequent manual operation. Thus back-driving of the input member 20 attached to the cam member 80 and the intermeshed remote lock actuating mechanism 18 is not required, with the result that the effort of manual actuation is considerably reduced by the lost motion provided by the clutch 22**.

Manual locking the latch mechanism 10 with the exterior lock actuating mechanism 26 is similar to manual locking with the interior lock actuating mechanism 24, except that the exterior lock actuating mechanism 26 directly engages and moves the index member 40 rather than acting through the output member 62. As the index member 40 is rotated from the unlock to the lock position thereof, the boss 74 on the index member 40 drives the output member 62 to rotate to the lock position of the output member 62. The boss 74 on the output member 62, is retained in the recess **46*a* of the index member 40 by the urging of the spring 78. Rotation of the output member 62 to the lock position causes the interior lock actuating mechanism 24** to be back-driven to the respective lock position thereof (for example, by moving a sill button downwardly).

The latch mechanism 10 may be remotely operated from the unlock condition to the lock condition. As shown in FIG. 8, the drive surface **82*c* of the cam member 80 is adjacent the drive surface 64*c* of the output member 62 when the cam member 80 is in the neutral position and the output member 62 is in the unlock position. To remotely lock the latch mechanism 10, the remote lock actuating mechanism 18 is energized to rotate the input member 20, together with the cam member 80, 30 degrees clockwise. Thus the cam member 80 drives the output member 62 30 degrees clockwise to the lock position thereof, as shown in FIG. 9. The output member 62 is coupled to the index member 40 and thus causes the index member 40 and the output lever 50 to rotate 30 degrees clockwise to the respective lock positions thereof. Once the motor of the remote lock actuating mechanism 18 is deenergized, the centering spring 98 will pull the input member 20 and the cam member 80 back to the respective neutral positions thereof, as illustrated in FIG. 10. Thus the cam member 80** will rotate 30 degrees counter clockwise to the neutral position thereof.

When in the locked condition illustrated in FIG. 10, with the cam member 80 in the neutral position thereof, the latch mechanism 10 may be remotely operated to the unlocked condition, as previously described above. The latch mechanism 10 may also be manually operated to the unlocked condition, using either the interior lock actuating mechanism 24 or the exterior lock actuating mechanism 26. In either case, the output member 62 and the index member 40 are simultaneously rotated 30 degrees counter clockwise to respective unlock positions, with the index member 40 carrying the output lever 50 to the unlock position, as illustrated in FIG. 8. Because of the lost motion provided by the clutch 22, the cam member 80 is not moved, and thus there is no back-driving of the remote lock actuating mechanism 24. Therefore, manual actuation effort is kept at a minimum.

The latch mechanism 10 may also be operated to uncouple the interior lock actuating mechanism 24 from the lock mechanism 16. This is accomplished by operating the remote lock actuating mechanism 18 to rotate the input member 20 and the cam member 80 clockwise from the neutral position to respective double lock positions thereof, and to hold the cam member 80 in the double lock position. Preferably the double lock position of the cam member 80 is 180 degrees from the neutral position thereof.

After the cam member 80 drives the output member 62 against the boss 37 on the frame 37, as shown in FIG. 9, the output member 62 will cease to rotate. As the cam member 80 continues to rotate, the lobe 82 thereon will act on the drive surface **64*c* to urge the output member 62 to move radially such that the spring 78 is compressed. The boss 74 on the output member 62 is moved out of the recess 46*a* on the index member 40. When the cam member 80 is fully rotated to the double lock position thereof, the lobe 82 bears against the shoulders between the notch 64*a* and the drive surfaces 64*b* and 64*c* of the output member 62. This holds the boss 74 on the output member 62 out of engagement with the recess 46*a* on the index member 40 when the output member 62 is in the lock position, the unlock position, or any point therebetween. Thus, even if the interior lock actuating mechanism 24 is operated to rotate the output member 62 from the lock position to the unlock position, as indicated by the dashed line in FIG. 11, the index member 40 and the output lever 50** carried thereon will remain in their respective lock positions.

The interior lock actuating mechanism 24 is thus uncoupled from the lock mechanism 16. However, the exterior lock actuating mechanism 26 remains coupled to the index member 40, and can be operated to rotate the index member 40 and the attached output lever 50 to their unlock positions, thereby unlocking the latch mechanism 10.

The remote lock actuating mechanism 18 can be operated to take the latch mechanism out of the double locked condition by being energized to rotate the input member 20 and the attached cam member 80 240 degrees counter clockwise. After 150 or 180 degrees of rotation, depending on whether the output member 62 is in the lock position or unlock position, respectively, the lobe 82 on the cam member 80 will disengage from the drive surface **64*c* on the output member 62. The boss 74 will then be able to fully seat within the recess 46*c* in the index member 40, coupling the output member 62 and the interior lock actuating mechanism 24 to the lock mechanism 16**.

After the full 240 degree rotation, the cam member 80 will have rotated the output member 62, the index member 40 coupled to the output member 62, and the output lever 50 carried on the index member 40 to the respective unlock positions thereof, as illustrated in FIG. 7. When the remote lock actuating mechanism 18 is deenergized, the cam member 80 will be rotated back to the neutral position thereof, as shown in FIG. 8, by the centering spring 98 acting through the input member 20, as described above.

Figure 12:
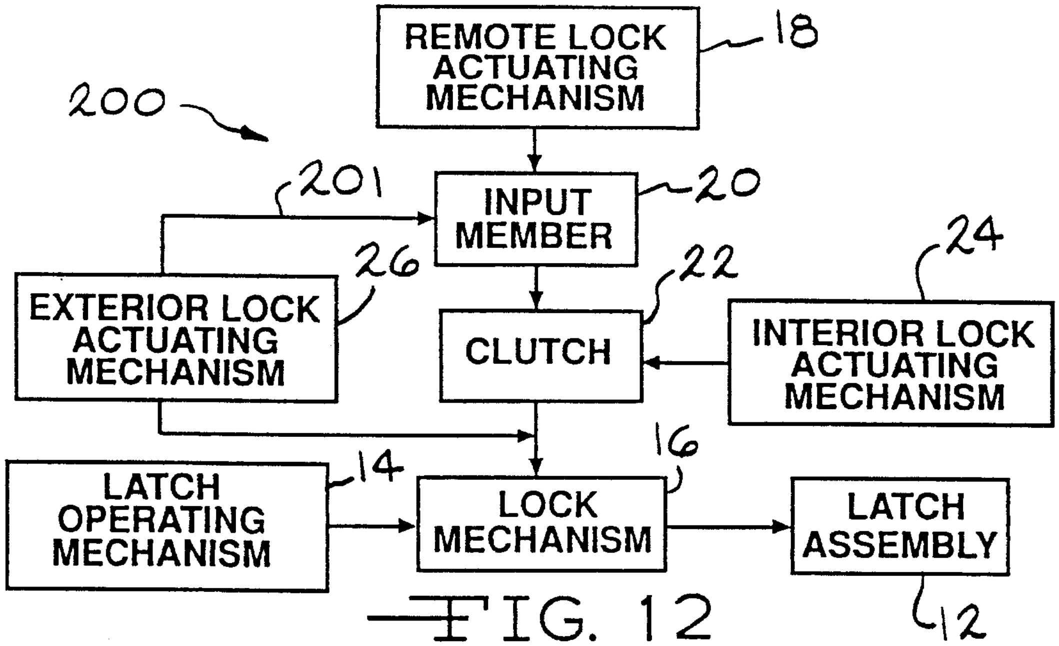
FIG. 12 is a view similar to that of FIG. 1, illustrating a second embodiment of the clutch according to the invention, in which the exterior lock actuating mechanism is adapted to selectively move the cam member out of the double lock position.
Figure 13:
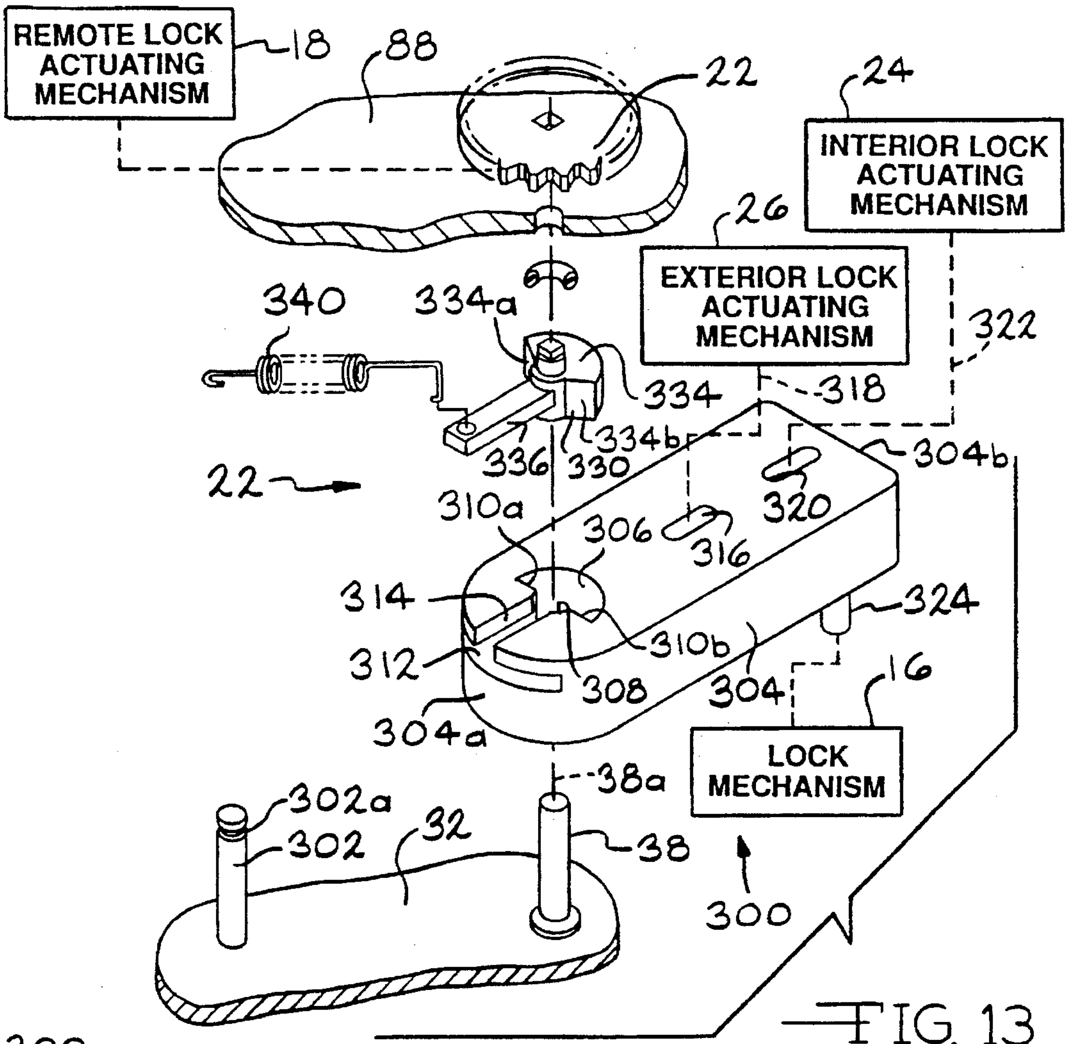
FIG. 13 is a view similar to that of FIG. 2, illustrating a third embodiment of the clutch according to the invention which is simplified to omit the double locking feature of the first and second embodiments.

It will be appreciated that the exterior lock actuating mechanism 26 might be connected to rotate a component such as the cam member 80, the input member 20, or a convenient component in the remote lock actuating mechanism 18 rather than, or in addition to, the index member 40. For example, FIG. 12 schematically illustrates a latch mechanism 200 which is similar to the latch mechanism 10 described above. The same reference numbers are used to indicate similar components. In the latch mechanism 200, an additional linkage 201 connects the exterior lock actuating mechanism 26 to the input member 20. When the cam member 80 and the input member 20 are in the neutral position, the linkage 201 allows the exterior lock actuating mechanism to rotate the index member 40 between the lock and unlock positions thereof without rotating the input member 20 or back-driving the remote lock actuating mechanism 18. However, when the cam member 80 and the input member 20 are in the double lock position, the linkage 201 is driven by the exterior lock actuating mechanism 26 to rotate the cam member 80 out of the double lock position to the neutral position thereof. This allows the interior lock actuating mechanism 24 to be coupled to the lock mechanism 16 by allowing the boss 74 to engage the recess 46*a* on the index member 40 under the urging of the spring 78. This recoupling can thus be accomplished even if the vehicle battery (not shown) were to die, leaving no power to operate the remote lock actuating mechanism 18. The exterior lock actuating mechanism 26 also rotates the index member 40 and the attached output lever 50 to their unlock positions, in the same manner as the latch mechanism 10 described above.

FIGS. 13 through 17 illustrate a third embodiment of a latch mechanism according to the present invention, indicated generally at 300. The latch mechanism 300 is generally similar to the latch mechanisms 10 and 200 described above, and the same reference numbers are used to indicate similar components. In the latch mechanism 300, the frame 32 supports the upwardly extending pivot pin 38 and an additional pin 302 spaced apart from the pivot pin 38. The pin 302 has a circumferentially extending groove 302*a* formed thereon, the purpose of which will be explained below.

The clutch 22 of the latch mechanism 300 includes an output member 304. The output member 304 has a first end 304*a* and a second end 304*b*. The output member 304 has a semi-cylindrical recess 306 formed in the upper surface thereof at a point spaced apart from the first end 304*a*. The recess 306 is oriented with the flat portion thereof extending transversely across the output member 304 near the first end 304*a*, and the curved portion thereof extending toward the second end 304*b* of the output member 304. A vertically extending cylindrical notch 308 is formed in the middle of the flat vertical wall of the recess 306, dividing the wall into two coplanar drive surfaces 310*a* and 310*b*. The center of curvature of the notch 308 is the axis 38*a*. A vertical bore (not shown) is formed vertically through the output member 304 which extends from the bottom surface of the output member 304 into the bottom of the notch 308 and the recess 306. The vertical bore receives the pivot pin 38 to pivotally mount the output member 304 on the pivot pin 38 for rotation about the axis 38*a*.

A wedge-shaped opening 312 is formed in the first end 304*a* of the output member 304. The vertical walls of the opening 312 are formed along lines extending radially outwardly from the axis 38*a*. The upper and lower surfaces of the opening 312 are spaced apart horizontal surfaces. A slot 314 is formed in the upper surface of the output member 304 which extends to and communicates with the opening 312. The slot 314 extends from the first end 304*a* of the output member 304 to the notch 308.

The output member 304 includes a slot 316 which receives a connecting member of a linkage 318 operatively connecting the exterior lock actuating mechanism 26 to the output member 304. An additional slot 320 receives a connecting member of a linkage 322 operatively connecting the interior lock actuating mechanism 24 to the output member 304. A pin 324 fixed to the output member 304 extends downwardly from the lower surface thereof. As will be further discussed below, the output member 304 can be moved to a lock position in which the pin 324 blocks movement of selected components of the latch mechanism 300 to lock the latch mechanism 300.

The clutch 22 of the latch mechanism 300 also includes a cam member 330 pivotally mounted on the upper end of the pivot pin 38. The cam member 330 is generally identical in construction to the cam member 80 described above, and includes a lobe 334 disposed within the recess 306 in the output member 304. The lobe 334 includes a pair of drive surfaces 334*a* and 334*b*. The input member 20 of the clutch 22 is fixed to the cam member 330.

The cam member 330 differs from the cam member 80 in that a radially outwardly extending arm 336 is formed on the cam member 80 opposite the lobe 334. The arm 336 extends through the opening 312. A hole 338 is formed near the radially outer end of the arm 336.

Figure 14:
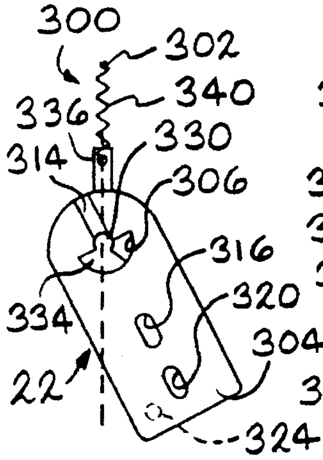
FIG. 14 is a schematic diagram of the cam member and output member illustrated in FIG. 13, with the output member in the unlock position and the cam member in a neutral position.
Figure 16:
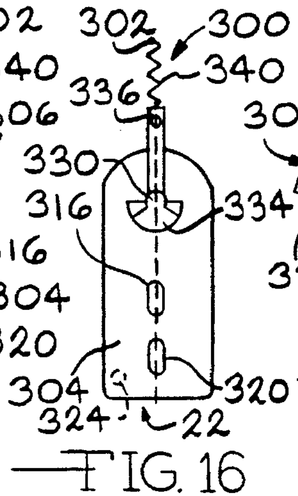
FIG. 16 is a view similar to that of FIG. 15, except the output member is in the lock position and the cam member is in a neutral position.

A centering spring 340 is stretched between the hole 338 in the arm 336 of the cam member 330 and the groove 302*a* on the pin 302 fixed to the frame 32. The centering spring 340 urges the cam member 330 to a neutral position, as shown in FIGS. 14 and 16, in which the arm 336 of the cam member 330 is closest to the pin 302.

During assembly of the latch mechanism 300, after the output member 304 is mounted on the pivot pin 38, the cam member 330 is mounted on the upper end of the pivot pin 38. As the cam member 330 is downwardly into the recess 306 in the output member 304 and onto the pivot pin 38, the arm 332 is moved downwardly through the slot 314 into the opening 312 in the output member 304.

Figure 15:
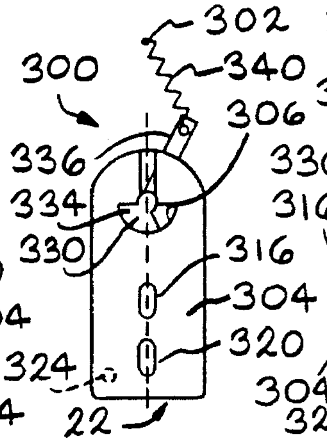
FIG. 15 is a view similar to that of FIG. 14, except the output member and the cam member are both in the lock position.

The operation of the latch mechanism 300 will now be explained. FIG. 14 schematically illustrates the latch mechanism 300 in an unlock position, with the cam member 330 in a neutral position. To remotely place the latch mechanism in a locked condition, the remote lock actuating mechanism 18 is operated to rotate the input member 22 and the cam member 330 attached thereto 30 degrees clockwise to respective lock positions thereof. This causes the drive surface 334*b* on the cam member 330 to contact the drive surface 310*b* on the output member 304 and drive the output member 304 30 degrees clockwise to the lock position thereof. This causes the centering spring 340 to be stretched, as illustrated in FIG. 15. The remote lock actuating mechanism is then deenergized, and the centering spring 340 acts on the arm 336 to urge the cam member 330 to return to the neutral position of the cam member 330, as illustrated in FIG. 16.

When the output member 304 is positioned in the lock position, the pin 324 is positioned to block movement of the linkage in the lock mechanism 16 connecting the latch operating mechanism 14 to the latch assembly 12. With the pin 324 in this blocking position, the latch operating mechanism 14 is prevented from unlatching the latch assembly 12, and the latch mechanism 10 is locked.

Either the exterior lock actuating mechanism 26 or the interior lock actuating mechanism 24 can be actuated to manually move the output member 304 from the unlock position illustrated in FIG. 14 to the lock position illustrated in FIG. 16 without moving the cam member 330. Similarly, either the exterior lock actuating mechanism 26 or the interior lock actuating mechanism 24 can be actuated to manually move the output member 304 from the lock position illustrated in FIG. 16 to the lock position illustrated in FIG. 14 without having moving the cam member 330. Since the cam member 330 does not move, the remote lock actuating mechanism 18 is not back-driven. The clutch 22 of the latch mechanism 300 provides lost motion to minimize the effort required to manually actuate the latch mechanism 300 between lock and unlock positions.

Figure 17:
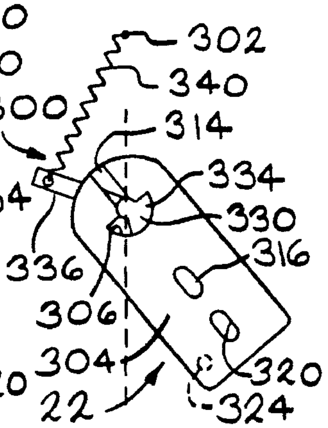
FIG. 17 is a view similar to FIG. 14, except the output member and the cam member are both in the unlock position.

With the latch mechanism 300 in the lock position illustrated in FIG. 16, the remote lock actuating mechanism 18 can be operated to rotate the input member 22 and the cam member 330 attached thereto 60 degrees counterclockwise to the respective unlock positions thereof. This causes the drive surface 334*a* on the cam member 330 to contact the drive surface 310*a* on the output member 304 and drive the output member 304 30 degrees counterclockwise to the unlock position thereof. This causes the centering spring 340 to be stretched, as illustrated in FIG. 17. The remote lock actuating mechanism is then deenergized, and the centering spring 340 acts on the arm 336 to urge the cam member 330 to return to the neutral position, as illustrated in FIG. 14.

The clutch of the present invention has been described in a variety of embodiments. However, the scope of the invention is not limited thereto, as various application of the present invention and modifications thereto will be apparent to those of ordinary skill in the art after studying this application. Accordingly, such modifications and changes in application can be carried out without departing from the scope of the invention which is intended to be limited only by the scope of the appended claims. For example, the third embodiment of the clutch was described above in the application of a lock mechanism selectively blocking operation of the associated latch assembly to lock the latch mechanism. However, it will be appreciated that the clutch therein described could be used with a lock mechanism selectively uncoupling a latch operating mechanism from a latch assembly to lock the latch mechanism, similar to the lock mechanism described as being used with the first embodiment of the clutch of the present invention. Indeed it should be understood that the clutch of the present invention can be utilized in latch mechanisms which have components which are uncoupled to lock the latch mechanism, blocked to lock the latch mechanism, or uncoupled and blocked to lock the latch mechanism.

In accordance with the provisions of the patent statutes, the principle and mode of operation of the present invention have been explained and illustrated in the preferred embodiments, however, it will be understood that the present invention may be practiced otherwise than as specifically explained and illustrated without departing from its spirit or scope.

What is claimed is:

1. A clutch, comprising:

a frame:

a cam member pivotally mounted on said frame for selective rotation about an axis between a first position and a second position, said cam member having a first drive surface and a second drive surface defined thereon;

an output member rotatable about said axis between a third position and a fourth position, said output member having a first drive surface and a second drive surface spaced apart from said first drive surface, said first drive surface of said output member disposed to be engaged by said first drive surface of said cam member when said cam member is rotated to said first position to drive said output member to said third position, said second drive surface of said output member disposed to be engaged by said second drive surface of said cam member when said cam member is rotated to said second position to drive said output member to said fourth position; and a spring having a first end fixed to said frame and a second end operatively coupled to stud cam member, said spring urging said cam member to rotate about said axis toward a neutral position between said first position and said second position such that said first drive surface of said cam member is spaced apart from said first drive surface of said output member when said output member is in said third position and said second drive surface of said cam member is spaced apart from said second drive surface of said output member when said output member is in said fourth position.

2. The clutch defined in claim 1 wherein at least one of said first and second drive surfaces of said output member is a flat surface.

3. The clutch defined in claim 2 wherein said first and second drive surfaces of said output member are co-planar.

4. The clutch defined in claim 1 wherein a notch is defined in said output member between said first and second drive surfaces of said output member, a portion of said cam member being selectively moveable into said notch.

5. The clutch defined in claim 4 wherein said portion of said cam member moveable into said notch defines a curved surface having a center of curvature coincident with said axis and defining a radius.

6. The clutch defined in claim 5 wherein said notch defines a curved surface having a radius substantially equal to said radius of said portion of said cam member.

7. The clutch defined in claim 5 further including a second spring having a first end operatively engaging said output member and a second end operatively engaging said cam member, said second spring urging said output member and said cam member into mutual contact.

8. The clutch defined in claim 7 wherein said second spring is compressed between said output member and said cam member.

9. The clutch defined in claim 1 wherein said cam member includes a radially outwardly projecting lobe, said first and second drive surfaces of said cam member being formed on said lobe.

10. The clutch defined in claim 9 wherein said first and second drive surfaces of said cam member define an angle through said lobe of less than 180 degrees and said first and second drive surfaces of said output member are co-planar.

11. The clutch defined in claim 1 further including an input member directly engaging said cam member for rotation therewith, said spring being fixed at said second end of said spring to said input member.

12. The clutch defined in claim 1 wherein said cam member includes an arm formed thereon, said spring being fixed at said second end of said spring to said arm.

13. The clutch defined in claim 9 wherein said cam member includes an arm extending radially outwardly from said cam member diametrically opposite said lobe.

14. The clutch defined in claim 12 wherein said output member includes an opening therein through which said arm extends.

15. The clutch defined in claim 11 further including a second input member, said second input member directly engaging said output member, said second input member being selectively moveable to rotate said output member about said axis between said third and fourth positions.

16. The clutch defined in claim 15 further including an output lever selectively operatively coupled to rotate said output member.

17. The clutch defined in claim 16 further including an index member directly coupled to said output lever, said index member driving said output lever to rotate therewith, said index member having a recess defined thereon, said output member having a boss formed thereon, said output member and said index member being coupled for simultaneous rotation about said axis when said boss on said output member is disposed within said recess on said index member, said output member being selectively moveable relative to said index member to a disengaged position where said boss on said output member is withdrawn from said recess on said index member, said output member being rotatable relative to said index member and said output lever when said output member is in said disengaged position.

18. The clutch defined in claim 17 wherein said cam member is rotatable to a double lock position in which said cam member holds said output member in said disengaged position.

19. A clutch, comprising:

a frame;

a cam member pivotally mounted on said frame for selective rotation about an axis to a first position, a second position, and a third position, said cam member having a first drive surface and a second drive surface;

an index member pivotally mounted on said frame and rotatable about said axis, said index member having a recess defined thereon;

an output lever mounted on said index member for rotation therewith, said output lever moveable radially relative to said index member;

an output member having a inner surface defining an opening through said output member, said inner surface defining a radially inwardly extending boss, a first drive surface, and a second drive surface, said output member rotatable about said axis between a third position and a fourth position, said first drive surface of said output member disposed to be engaged by said first drive surface of said cam member when said cam member is rotated to said first position to drive said output member to said third position, said second drive surface of said output member disposed to be engaged by said second drive surface of said cam member when said cam member is rotated lo said second position to drive said output member to said fourth position, said output member being selectively radially moveable relative to said index member between a first radial position in which said boss of said output member engages said recess in said index member to couple said index member to said output member for rotation therewith and a second radial position in which said boss of said output member is withdrawn from said recess in said index member and said index member and said output member are uncoupled;

a first input member operatively coupled to said cam member for selectively rotating said cam member to said first, second, and third positions;

a second input member directly engaging said output member, said second input member being selectively moveable to rotate said output member about said axis between said third and fourth positions; and a spring having a first end fixed to said frame and a second end operatively coupled to said cam member, said spring urging said cam member to rotate about said axis toward a neutral position between said first position and said second position such that said first drive surface of said cam member is spaced apart from said first drive surface of said output member when said output member is in said third position and said second drive surface of said cam member is spaced apart from said second drive surface of said output member when said output member is in said fourth position.

* * * * *

UNITED STATES PATENT AND TRADEMARK OFFICE

CERTIFICATE OF CORRECTION

PATENT NO. : 5,577,583

DATED : November 26, 1996

INVENTOR(S) : Patrick H. O'Donnell

It is certified that error appears in the above-indentified patent and that said Letters Patent is hereby corrected as shown below:

Column 13, Claim 1, Line 2, after "frame", change ":" to -- ; --.

Column 14, Claim 1, Line 4, after "to", change "stud" to -- said --.

Column 16, Claim 19, Line 6, after "rotated", change "lo" to -- to --.

Signed and Sealed this

First Day of April, 1997

Attest:

Bruce Lehman

BRUCE LEHMAN

*Attesting Officer* *Commissioner of Patents and Trademarks*